Nov. 29, 1938.  E. J. PILBLAD  2,138,585
VULCANIZING DEVICE
Filed Nov. 14, 1935
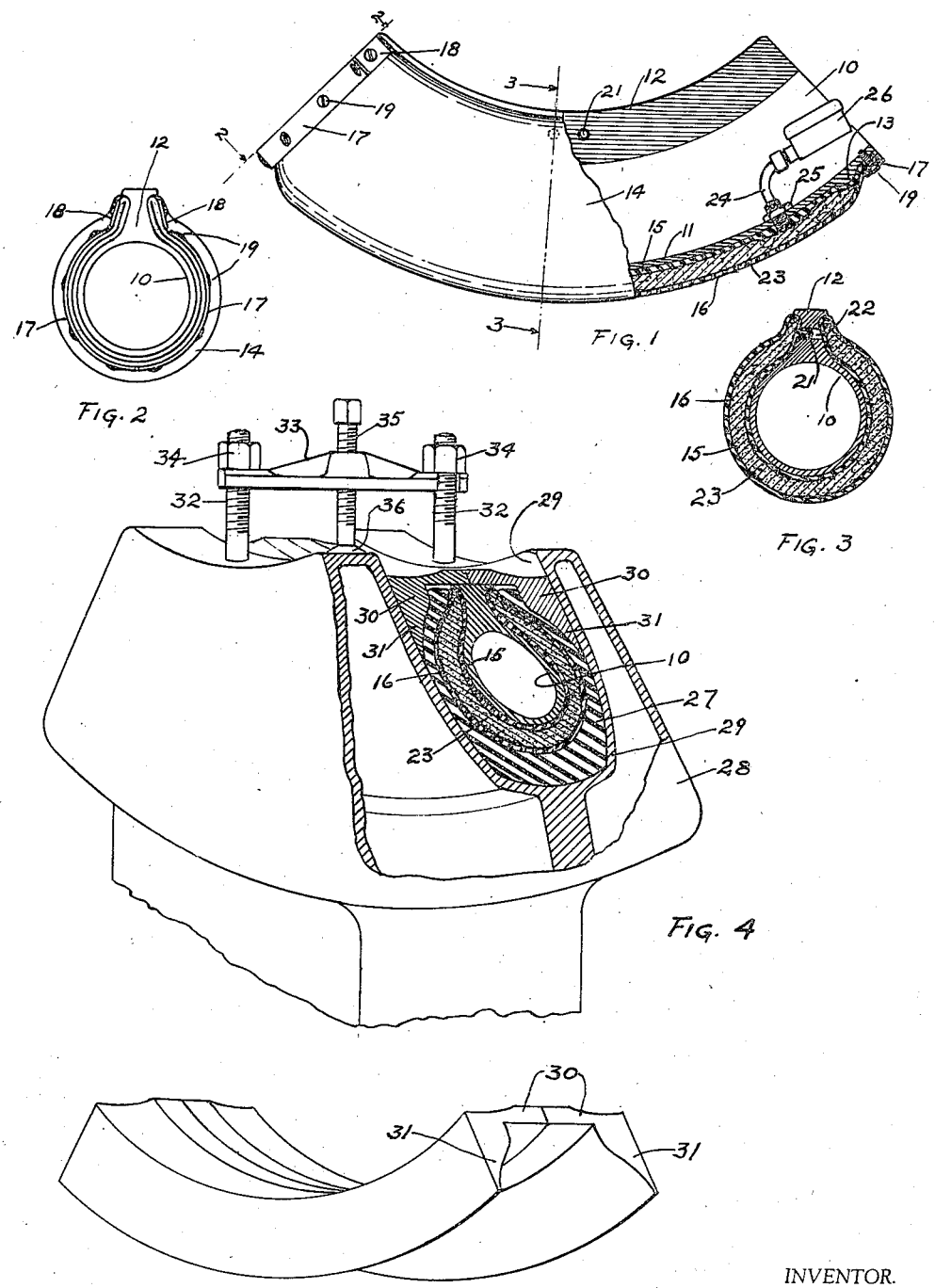
INVENTOR.
ERIC J. PILBLAD.
BY
ATTORNEY.

Patented Nov. 29, 1938

2,138,585

UNITED STATES PATENT OFFICE 2,138,585

VULCANIZING DEVICE

Eric J. Pilblad, Rockville Centre, N. Y., assignor of seventeen and one-half percent to Charles C. Strange, Port Richmond, Staten Island, N. Y., seventeen and one-half percent to Bess Aaronson, Meriden, Conn., and seventeen and one-half percent to Alan J. McIntosh, seventeen and one-half percent to Alvan L. Barach, and twelve and one-half percent to Edmund J. Barach, New York, N. Y.

Application November 14, 1935, Serial No. 49,698

5 Claims. (Cl. 18—18)

This invention relates to vulcanizing apparatus, and more particularly to a vulcanizer embodying means for transmitting an equal pressure to each unit area of an irregular surface.

One of the objects of the present invention is to provide a novel pressure transmitting unit which may be employed in applying a substantially equalized pressure to each unit of area of a curved or irregular surface by a unidirectional application of pressure to said unit.

In the art of vulcanizing rubber goods and particularly in the art of vulcanizing the inner surfaces of automobile tires, pressure equalizing units comprising molded rubber bags and having a shape similar to a section of the tire have been heretofore provided. These units are adapted to be inserted in the tire and expanded by high air pressures to apply pressure to each unit area of the patch being vulcanized. Because of the high air pressures required to obtain a satisfactory distribution of pressure with such units, it has been found necessary in the interest of safety to employ a bag having comparatively heavy wall thicknesses. The heavy walls not only increase the weight and expense of said unit, but they also materially decrease the flexibility and deformability of the same and accordingly decrease the pressure equalizing ability and greatly enhance the number of pounds of air pressure required. The end walls of these molded rubber bags must be exceptionally thick, since nothing is present to resist the pressure at the ends of the unit when the same is in operative position on the tire. Furthermore, it has been found that it is extremely difficult to maintain a uniform pressure on the vulcanized surface throughout the vulcanizing process because of the changes of pressure in the storage tank or leaks in any of the air connections. The temperature of the compressed air in the unit rises as high as 300° Fahrenheit and thereby causes the rubber to deteriorate and carbonize, thus weakening the structure which, in view of the high pressures employed, becomes a serious hazard to the safety of both personnel and equipment. When air pressure is employed, a constant source of supply is necessary, and this entails an expense which is prohibitive to dealers operating on a small scale. There is also the constant danger of careless operators who inflate the unit to the point of rupturing the same, thereby causing injury to persons and property.

It has also been proposed to use a bag substantially filled with sand or similar substances as pressure transmitting units for repairing the inner walls of tire casings. It has been found, however, that such substances do not flow freely enough under pressure, especially when confined in a flexible bag, to distribute the pressure equally to all parts of the patch. Such units have accordingly been displaced by the air pressure units above discussed. Other disadvantages inherent in said filled bags lie in the fact that sand absorbs a large quantity of heat at a very slow rate, thus increasing the time required to prepare the unit for vulcanizing operation, and, what is an even more serious difficulty, rendering it practically impossible to maintain a substantially even temperature throughout the vulcanizing process.

Accordingly, another object of this invention is to provide a pressure equalizing unit which will obviate the above noted disadvantages and difficulties encountered in the use of units of the type heretofore provided.

Still another object is to provide novel means for subjecting irregular surfaces to an equally distributed pressure adapted to be mechanically applied.

A further object is to provide novel pressure equalizing means which is so constructed as to eliminate the necessity of employing an excessively high pressure therein to obtain the desired distribution of pressure in the vulcanization of rubber articles or the like.

A still further object is to provide a pressure equalizing unit which is more durable, less expensive and more reliable than similar devices heretofore provided.

A still further object is to provide novel apparatus for repairing rubber goods and the like, wherein a uniform pressure may be maintained on the area being repaired without the constant and careful supervision of an operator.

Still another object is to provide novel tire vulcanizing apparatus wherein a substantially uniform temperature may be maintained without altering the intensity of the heat supply during the process of vulcanization.

Another object is to provide a novel pressure equalizing unit which is so constructed as to eliminate any danger of explosion and consequent injury to personnel or equipment.

The above and other objects and novel features of this invention will more fully appear from the following detailed description when taken in connection with the accompanying drawing. It is to be expressly understood, however, that the drawing is for the purpose of illustration only and is not designed as a definition of the limits of the invention, reference being primarily had for this purpose to the appended claims.

In the drawing, wherein like reference characters refer to like parts throughout the several views, Fig. 1 is a side elevation, partly in section, of a device embodying the present invention;

Fig. 2 is an end view, taken on line 2—2 of Fig. 1;

Fig. 3 is a section taken on line 3—3 of Fig. 1;

Fig. 4 is a perspective view, partly in section and with parts broken away, of a tire vulcanizing apparatus embodying the invention; and Fig. 5 is a perspective detail view of a pressure applying element of said apparatus.

A single embodiment of the invention is illustrated, by way of example, in the form of an apparatus for vulcanizing a patch onto the wall of an automobile tire or for retreading the same. In vulcanizing a patch on a rubber article such as a tire, it is desirable to employ a patch which is comparatively thick at the center or over the immediate vicinity of the ruptured or weakened portion of the article and which tapers to somewhat of a feather edge on each side thereof, thereby leaving a smooth face when the vulcanization is completed. In order to apply the patch in a satisfactory and effective manner, it is necessary that the same be held against a heating element by the application of pressure at each portion thereof and the quality of the results depends in a large measure on the equal distribution of a proper pressure over the whole area of the patch and upon the uniformity of said pressure throughout the vulcanizing process. It is also desirable that the pressure be applied at each point in a line which is normal to the surface at said point. Each patch, irrespective of its size, assumes a different shape and presents a different surface or contour to the pressure element due to the varying curvature of the patch and of the tire to which the patch is applied, and it is accordingly necessary to subject the same to pressure through the medium of a deformable pressure element placed in direct contact with the patch and surrounding surface of the tire.

The present invention comprehends a pressure equalizing unit which meets the above requirements and which is simple in construction, inexpensive to manufacture, and economical and reliable in operation. In the form shown, said unit comprises a metallic core member 10 shaped similarly to a circumferential section of an automobile tire, the upper end lower edges thereof in a longitudinal direction preferably having the same center of curvature as the tire with which it is desired to use the same. Member 10 is constituted by an arcuate tube portion 11, which is preferably circular in radial cross-section, and a radially and inwardly extending longitudinal flange 12, formed integrally with the upper edge of tube 11. Flange 12, as shown, is T-shaped in radial cross-section, the vertical leg thereof having a substantial thickness with the sides joined to the outer surface of tube portion 11 by fillets. An annular bead 13 may be provided on the outer surface of tube 11 near each end thereof for a purpose to hereinafter appear.

The deformable element employed in carrying out the invention is so made as to be readily secured to and removed from core 10 in order to facilitate replacement at a relatively low cost in comparison to the pressure equalizing units now in common use. Said element is also designed to have the minimum deformable volume consistent with a proper distribution of pressure, thereby minimizing the heat absorption of the unit and the time required for the same to reach its maximum temperature for a given operation as well as minimizing the necessary movement of core 10 for applying a proper pressure to the area to be vulcanized.

In the illustrated embodiment, a deformable element comprises a fabric reinforced rubber bag 14 made in the form of a tube, the walls thereof being only sufficiently flexible and elastic to be readily conformable to an irregular surface at the desired operating pressures. The modulus of elasticity of the walls of bag 14 is preferably as great as is possible without interfering with the ready deformability thereof under the smallest pressures at which it is desired to operate in order that there will be no excessive stretching at points which are not supported by external pressure resisting bodies when the equalizing unit is in operative position. The least possible stretch consistent with the required deformability at the minimum operating pressure is highly desirable, since the movement of core 10 required to increase the pressure being exerted by said unit is thereby minimized.

As heretofore pointed out, in devices of the prior art, the entire end of the pressure bag is subjected to the high pressure employed therein, and because the expansion thereof is unresisted during operation it becomes necessary to construct the bag with excessively thick and heavy end walls when even then remain points of frequent failure. Furthermore, the pressure exerted on the entire area of each end wall tends to stretch the bag longitudinally and to draw the curved and longitudinal axis thereof into a straight line. The former tendency necessitates the use of heavier bag walls in order to prevent failure thereof, whereas both of said tendencies necessitate the employment of higher internal pressures in order to conform the walls of the bag to the irregular surface being repaired.

By reason of the construction of bag 14 and the novel manner in which the same is associated with and secured to core 10, the unsupported end areas of said bag are negligible. If desired, the unsupported end areas may be substantially eliminated, but some stretch is preferable in order to increase the range of pressure which may be applied through the unit. In the form shown, tube or bag 14 is folded into a U-shaped, a portion 15 of the wall of said tube engaging the bottom and side walls of tube portion 11 and the leg of T-portion 12 of core 10. Tube 14 may be made with the ends thereof closed or, as shown in Fig. 1, the walls 15 and 16 may be vulcanized together at the ends of said tube to complete the enclosure and render the bag leak-proof. It has been found in practice that a wall thickness of three-sixteenths of an inch gives very satisfactory results without danger of rupture under the pressures employed, whereas a wall thickness of at least three-quarters of an inch is found necessary in the air pressure bags now in common use.

The means for securely fastening bag 14 to core 10 comprises a plurality of sheet metal band sections 17 and 18. Said band sections engage the outer surface of bag 14 adjacent the ends thereof and are secured to core 10 by means of screws or bolts 19 which have threaded engagement with said core. The ends of bag 14 are preferably vulcanized over a sufficient area so that the closure constituted by the bag is not disturbed by the holes provided for bolts 19, or if said bag is manufactured with one or both ends already closed, a lip of solid rubber may be provided at such closed ends. If desired, the thickness of bands 17, 18 may be increased to thereby form an end wall to prevent excessive expansion of the outer wall 16 of bag 14 when the equalizing unit is in operative position and placed under pressure.

In order to prevent any sagging of bag 14 and to hold the same in contact with core 10 when the unit is not in use, a plurality of pins 21, adapted to extend into recesses 22 in the T-portion 12 of said core, may be vulcanized to wall 15 of bag 14. Only two of such pins are employed in the illustrated embodiment, but it will be apparent that any desired number of the same may be provided.

As has been heretofore pointed out, it has been found highly desirable to maintain the temperature and pressure substantially constant during the entire process of vulcanization, and this cannot be accomplished without continuous and careful supervision when air or sand is employed as the pressure applying or pressure transmitting medium for reasons already started. Accordingly, the present invention comprehends the use of a liquid or a readily deformable plastic substance 23 within bag 14, said substance being substantially incompressible and having a very low coefficient of expansion, thereby eliminating any expansion due to temperature variations and any consequent increase in pressure within the range of temperatures employed for vulcanizing. If plastic material is employed, the same preferably has such a consistency as to be readily responsive to shaping influences and adapted to flow readily under pressure. One suitable mixture or composition which has proved suitable and effective as a plastic substance consists of seventy-five percent by volume of diatomaceous earth and twenty-five percent by volume of castor oil. This mixture has the consistency of putty and flows freely upon the application of pressure. Additionally, it has the property of low internal cohesion, thereby causing any pressure applied thereto in a confined space to be distributed with substantial uniformity through the plastic mass and to exert a pressure against each portion of the walls of the container in a direction normal thereto.

Pressure distributing substance 23 may be injected into bag 14 through a tube 24 which, as shown, is vulcanized at the inner end thereof to bag wall 15 and extends through an opening adjacent one end of core 10. Tube 24 may be secured in place by means of a nut 25 engaging an enlarged threaded portion of said tube. In order to avoid the presence of air pockets in bag 14, plastic material 23 is preferably forced into said bag under a slight pressure, thereby insuring complete filling thereof without placing the bag walls under any material initial strain. It will be apparent that when the unit is being filled in this manner, wall 16 will assume such an outline that the volume of bag 14 will be a maximum, taking into consideration, of course, the position in which said bag is secured to core 10. After bag 14 has been filled, a suitable pressure gauge 26 may be secured to the outer end of tube 24, if desired.

In order to divide the pressure applying load between the walls 15 and 16 of bag 14, the former wall, when said bag is first secured to core 10 and before the bag is filled with plastic substance 23, may be stretched over beads 13, thus preventing parts of said wall from engaging core portion 12. When pressure is then applied to the liquid or plastic substance confined in bag 14, wall 15 thereof is permitted to stretch, thereby reducing the required stretching of wall 16.

In use, the pressure equalizing unit above described is inserted in a tire casing 27 in contact with the inner surface thereof, T-portion 12 projecting inwardly of the rim edges of said tire. The tire is in turn inserted in a heating mold 28 provided with a suitably formed recess 29 for receiving the tire. Preferably the mold body 28 is hollow and adapted to be heated by means of the circulation of steam therethrough, but electric or other types of heating elements may be employed, if desired. A pair of bead blocks or molds 30 are adapted to slidably fit into recess 29 and engage the upper surface of T-shaped portion 12 of core 10. Each of said blocks has a downwardly extending wedge-shaped projection 31 which conforms to the general shape of the upper side walls of tire 27 and are adapted to squeeze the opposite walls of the tire casing toward each other to thereby reduce the space within the casing.

Any suitable means may be provided for applying pressure to bead blocks 30, 31, and in the form shown such means are constituted by pressure clamps. Only one clamp is illustrated as comprising a pair of threaded bolts 32 rigidly secured to mold body 28 at the center of the upper surface thereof and projecting upwardly therefrom. A cross-piece 33 has sliding engagement with bolts 32 and is limited in its upward movement relative thereto by nuts 34. A threaded bolt 35 has threaded engagement with a central opening in said cross-piece and is connected at its lower end to a pressure plate 36, which is only partially shown in the drawing, by means of a swivel joint, said plate being adapted to engage bead blocks 30, 31.

When screw 35 is turned down by means of a suitable wrench, bead blocks 30, 31 transmit the generated pressure to core 10, thus moving the latter downwardly, while the angular surfaces of wedge portions 31 exert a lateral and downward pressure tending to move the rim portions 27 of the tire together. The initial downward movement of core 10 and bead blocks 30, 31 tends to distribute the plastic material 23, as is necessary to conform the surface of bag 14 to the inner surface of tire 27 and the surface of the patch which is being vulcanized thereon. Upon further movement of said core and blocks, there is a tendency to decrease the volume within bag 14, whereupon the walls thereof commence to stretch and a pressure is exerted against the walls of tire 27, the maximum possible pressure being a function of the modulus of elasticity of wall 16. Plastic material 23 has the property of low internal cohesion, and accordingly the pressure exerted thereon by core 10 and blocks 30, 31 is distributed throughout the plastic mass with a high degree of uniformity and is exerted against the walls of the container in a direction normal to the resisting surface. A substantially equal pressure is thereby exerted on each unit area which is engaged by wall 16.

The pressure being exerted will be indicated by gauge 26 and will remain susbtantially constant for a given setting of screw bolt 35, since the volume of plastic material will remain constant within the range of temperatures which it is necessary to employ. It will be noted that only a small movement of core 10 is required to effect appreciable pressure change within bag 14, and that due to the comparatively small volume of plastic substance 23 used, only a short time is required to heat the same, thereby rendering the equalizing unit more economical and assuring an even temperature during each complete operation.

There is thus provided a novel vulcanizing device which is simple, economical and reliable, wherein pressure may be substantially equally exerted upon each unit of area of an irregular surface without the necessity of a compressed air storage tank and high pressure air lines, said device being particularly adapted for use in connection with tire casings, either for retreading the same or for making spot or sectional repairs. There is also provided a novel pressure equalizing unit which may be inexpensively manufactured and which is adapted for use with present-day vulcanizing apparatus. The novel unit provided is easier to handle, it is less subject to leaks and consequent loss or variation of pressure, and it is less subject to failure than similar devices heretofore provided.

Although only one embodiment of the invention has been illustrated and described, it is to be expressly understood that the same is not limited thereto but that various changes may be made in the mechanical details, some of which have been suggested in the foregoing description, and in the design and arrangement of parts illustrated, as will now be apparent to those skilled in the art. For a definition of the limits of the invention, reference will be had primarily to the appended claims.

What is claimed is:

1. In apparatus of the class described, a heating element having a recess for receiving a portion of a tire casing, a pressure transmitting unit within said casing comprising a deformable container filled with and confining a plastic substance adapted to flow readily under pressure, wedge means extending into said recess and engaging the outer walls of the casing, and common pressure means for subjecting said unit and means to pressure whereby the space within the casing is reduced and the engaging surface of the deformable container is conformed to the contour of the casing wall.

2. In a vulcanizing device for repairing tire casings, a pressure equalizing unit comprising a rigid element having a portion adapted to extend into said casing, a flexible container interposed between said member and the inner wall of said casing, a surface of said container being adapted to engage substantially the entire inner surface of a section of said casing, and a plastic substance confined in said container.

3. In a vulcanizing device for repairing tire casings, a pressure equalizing unit comprising a rigid element having a portion adapted to extend into said casing, a flexible container interposed between said member and the inner wall of said casing, a surface of said container being adapted to engage substantially the entire inner surface of a section of said casing, a plastic substance confined in said container, and means for applying pressure to said rigid member for pressing said container against said entire inner surface of said section.

4. In apparatus of the class described, a support having a recess for receiving a section of a tire casing, pressure transmitting means disposed within and substantially filling said section comprising a deformable container having a compartment with an uninterrupted cross section in a plane extending radially of said casing and a rigid member engaging a portion of the exterior wall of said container, wedge means extending into said recess and engaging the outer walls of the casing and a projecting portion of said rigid member, and means for applying pressure to said wedge means whereby the space within the casing is reduced and the deformable container is pressed into engagement with substantially the entire periphery of the inner wall of a section of said tire casing.

5. In apparatus of the class described, a support having a recess for receiving a section of a tire casing, pressure transmitting means disposed within and substantially filling said section comprising a deformable container having a compartment with an uninterrupted U-shaped cross section in a plane extending radially of said tire, a plastic substance adapted to flow readily under pressure confined in said container and a rigid member having a portion engaging the exterior wall of said container and a portion projecting exteriorly of the casing, wedge means extending into said recess and engaging the outer walls of the casing and said projecting portion, and means for applying pressure to said wedge means whereby the space within the casing is reduced and the deformable container is pressed into engagement with substantially the entire periphery of the inner wall of a section of said tire casing.

ERIC J. PILBLAD.